(12) United States Patent  
O'Brien-Strain et al.

(10) Patent No.: US 7,797,359 B1
(45) Date of Patent: Sep. 14, 2010

(54) RECURSIVE DATA NAMING

(75) Inventors: Eamonn O'Brien-Strain, San Mateo, CA (US); James Allely Rowson, Fremont, CA (US); Yuhong Xiong, Fremont, CA (US)

(73) Assignee: Hewlett-Packard Development Company, L.P., Hoston, TX (US)

( * ) Notice: Subject to any disclaimer, the term of this patent is extended or adjusted under 35 U.S.C. 154(b) by 934 days.

(21) Appl. No.: 11/209,528

(22) Filed: Aug. 23, 2005

(51) Int. Cl.
*G06F 17/30* (2006.01)

(52) U.S. Cl. ...................................... 707/829
(58) Field of Classification Search ........................ None
See application file for complete search history.

(56) References Cited

U.S. PATENT DOCUMENTS

| | | | |
|---|---|---|---|
| 4,914,571 A | 4/1990 | Baratz et al. | |
| 5,434,974 A | 7/1995 | Loucks et al. | |
| 5,584,026 A | 12/1996 | Knudsen et al. | |
| 5,729,682 A | 3/1998 | Marquis et al. | |
| 5,764,906 A | 6/1998 | Edelstein et al. | |
| 5,862,325 A | 1/1999 | Reed et al. | |
| 6,151,624 A | 11/2000 | Teare et al. | |
| 6,240,416 B1 | 5/2001 | Immon et al. | |
| 6,434,548 B1 | 8/2002 | Emens et al. | |
| 6,611,843 B1 * | 8/2003 | Jacobs ........................ 707/102 |
| 6,760,734 B1 | 7/2004 | Stephens | |
| 7,146,370 B1 * | 12/2006 | Klindt et al. ................. 707/100 |
| 2002/0052884 A1 * | 5/2002 | Farber et al. ............. 707/104.1 |
| 2002/0112008 A1 * | 8/2002 | Christenson et al. ........ 709/206 |
| 2002/0116293 A1 * | 8/2002 | Lao et al. ....................... 705/27 |
| 2002/0147728 A1 * | 10/2002 | Goodman et al. ......... 707/104.1 |
| 2002/0154342 A1 * | 10/2002 | Haining ...................... 358/474 |
| 2004/0133606 A1 * | 7/2004 | Miloushev et al. .......... 707/200 |
| 2005/0216498 A1 * | 9/2005 | Georgalas et al. ........... 707/102 |
| 2006/0074904 A1 * | 4/2006 | Mungara et al. ............... 707/5 |
| 2006/0184576 A1 * | 8/2006 | Albert et al. ............. 707/104.1 |
| 2007/0005581 A1 * | 1/2007 | Arrouye et al. ................ 707/4 |
| 2007/0022087 A1 * | 1/2007 | Bahar et al. .................... 707/1 |

* cited by examiner

*Primary Examiner*—Don Wong
*Assistant Examiner*—Belinda Xue

(57) ABSTRACT

Recursive data naming is disclosed. A name is provided corresponding to a desired data item. A get procedure is defined, and is used upon the name. The get procedure recursively uses itself upon the metadata name, to retrieve a metadata item associated with the desired data item. The get procedure retrieves the desired data item.

32 Claims, 5 Drawing Sheets

RECURSIVE DATA NAMING

BACKGROUND

To locate and use a data item on a computer, it is generally necessary to have or to be able to obtain "metadata." Metadata is information about the data item. For example, metadata may tell us where to find the data item. Obtaining metadata may be particularly difficult in a data storage system for storing a large number of data items distributed across many computers.

A namespace defines a set of valid names for data items or other objects, and a hierarchical structure for the namespace helps eliminate ambiguity. For example, in the namespace of United States telephone numbers, a valid name generally comprises ten digits, in which a three-digit area code disambiguates a seven-digit local number.

In a stand-alone computer using a conventional disk-based operating system, data items (such as documents) may be stored in files. A file system is provided to associate each file with selected metadata describing the file. The operating system is able to obtain selected metadata (such as directory information) about each file in the file system. The metadata may include, for example, a name, a file type, a file size, and a physical or logical storage location where the file is stored, such as on a disk drive.

To organize the storage of files, a hierarchical file name is typically provided in such a file system. For example, a hierarchical file name may be used to express a file name by describing its location in nested directories on a disk drive. In this typical directory structure, an exemplary file name may be expressed as C:\docs\english\sample.txt, where "C:\" represents a highest-level (root) directory of a disk drive identified as Drive C, "docs" represents a second-level directory under the root, "english" represents a third-level directory under docs, and "sample.txt" represents a file stored in the english directory.

Computer networks, such as local-area networks (LANs), wide-area networks (WANs), and the Internet, are often configured to permit distributed data storage. Distributed data storage allows a user of a networked computer to access data items that are stored on another computer accessible through the network.

A typical example of a hierarchical name for distributed data storage is a conventional Uniform Resource Locator (URL), as widely used on the Internet. A user may enter a URL, such as http://example.com/docs/index.html, into a web browser. The web browser will generally use the domain name system (DNS), such as by querying a nameserver, in order to translate, map, or resolve the domain name example-.com to a corresponding numeric Internet Protocol (IP) address, such as 123.45.67.123. The IP address identifies a particular remote computer. The web browser may then use hypertext transfer protocol (HTTP) to establish a connection with the remote computer identified by the given IP address. The string "docs" represents a directory on the remote computer, where the remote computer will attempt to find a hypertext markup language (HTML) document called "index.html".

Existing hierarchical models for data naming in distributed data storage systems tend to bind data to a particular host computer on which the data resides, as illustrated by the foregoing examples of file names and URLs. Such data naming models generally lack flexibility for an environment that can be dynamically mapped onto a changing set of computers.

SUMMARY

In an aspect of the invention, a method for recursive data naming is disclosed. A name is provided corresponding to a desired data item. A get procedure is defined, and is used upon the name. In some embodiments, the get procedure determines a metadata name from the name. The get procedure recursively uses itself upon the metadata name, to retrieve a metadata item associated with the desired data item. The get procedure retrieves the desired data item.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. It is understood, however, that this invention is not limited to the precise arrangements and instrumentalities shown.

DETAILED DESCRIPTION

Figure 1:
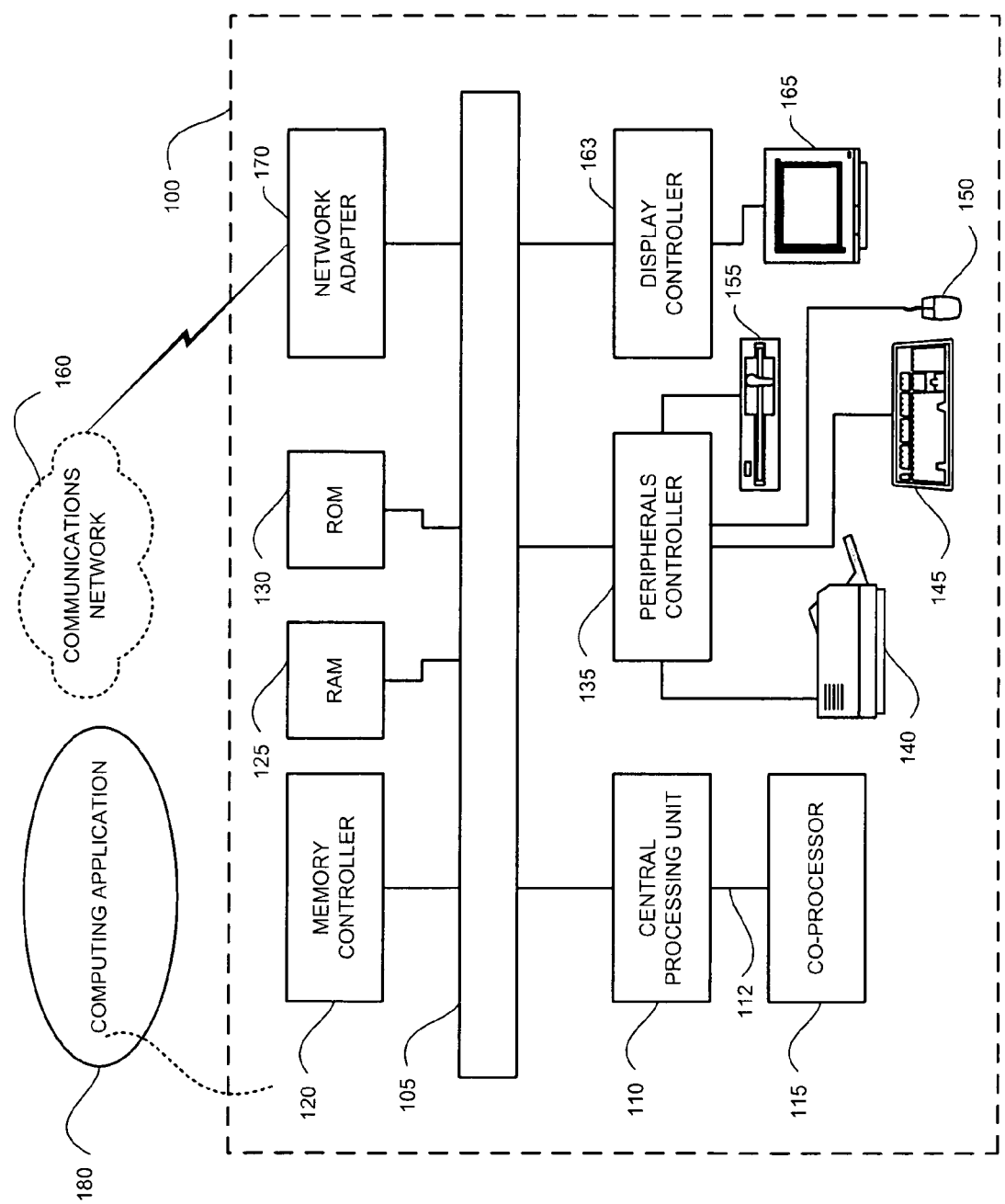
FIG. 1 is a block diagram of an exemplary computing environment in accordance with an implementation of the herein described systems and methods.

Aspects of the present invention simplify building and deploying software applications that run in a distributed way across multiple computers. Aspects of the invention may also be useful for software applications on a single computer.

A global namespace is provided that is decentralized, in that bindings of data to hosts are not explicit, but are stored in metadata documents which themselves are stored in the namespace as data items. That is, for a data item in the storage system, a storage specification (e.g., metadata identifying a storage location) is specified recursively in the storage system, in an additional data item comprising metadata. Such additional data items may be referred to as "metadata items." The metadata items themselves have, in turn, other metadata items that describe where they are stored, and so on, until ultimately we reach a default metadata, which is not stored in the storage system, and thus ends the recursion.

For example, for a document with a given hierarchical name such as "/a/b/c", one may locate the metadata item for the document by looking upward in a name hierarchy to determine the name of the metadata item. That is, suppose one needs the metadata about document "/a/b/c". First, one looks for "/a/b/.meta" (where ".meta" is a predetermined metadata identifier for a file containing metadata). If the needed metadata is not in "/a/b/.meta", or "/a/b/.meta" does not exist, one looks for "/a/.meta". If the needed metadata is not in "/a/

.meta", or "/a/.meta" does not exist, one looks for "/.meta". If the needed metadata is not in "/.meta", or "/.meta" does not exist, then a built-in set of metadata may be used, such as metadata that is defined through a property file local to the computer that is doing the lookup.

Note that if one is looking for a second metadata item that describes a first metadata item, the process is recursive. To look for the metadata for a metadata item named "/a/b/.meta", one starts at "/a/.meta" and works upward in the name hierarchy.

Tolerance of network outages and other failures may be enhanced because each data item or document, while bound to or owned by one particular device, may if desired be duplicated many times over in caches. Cache devices may, for example, communicate via a peer-to-peer protocol.

In an exemplary application of aspects of the invention, the work of providing a distributed software application can be split among different individuals or task groups, such as a group of engineers. For example, a first task group, among other tasks, may define a data model in abstract terms, such as a structure of interrelated data item names. The first task group need not take into account network characteristics such as bandwidth, or the storage capacity of different computers. The second task group, taking into account such particular deployment characteristics, creates the metadata that determines where the different data items are stored. Finally, local end users and/or system administrators may be empowered to revise or adjust the metadata, such as the allocation of data items to particular computers, to suit particular local computing environments or other needs.

Implementations of recursive data naming may be distributed and decentralized in a variety of ways. For example, the administrator of each computer can change its default metadata, thereby determining the mapping or binding of names to computers. In a further example, a possible source of mappings of names to computers is to discover the mappings on a local network using a local identifier. Names are separated from network addresses, providing greater flexibility in reallocating machines.

Reference will now be made in detail to an embodiment of the present invention, an example of which is illustrated in the accompanying drawings.

Illustrative Computing Environment

Referring to the drawings, in which like reference numerals indicate like elements, FIG. 1 depicts an exemplary computing system 100 in accordance with herein described systems and methods. The computing system 100 is capable of executing a variety of computing applications 180. Computing application 180 can comprise a computing application, a computing applet, a computing program and other instruction set operative on computing system 100 to perform at least one function, operation, and/or procedure. Exemplary computing system 100 is controlled primarily by computer readable instructions, which may be in the form of software. The computer readable instructions can contain instructions for computing system 100 for storing and accessing the computer readable instructions themselves. Such software may be executed within central processing unit (CPU) 110 to cause the computing system 100 to do work. In many known computer servers, workstations and personal computers CPU 110 is implemented by micro-electronic chips CPUs called microprocessors. A coprocessor 115 is an optional processor, distinct from the main CPU 110 that performs additional functions or assists the CPU 110. The CPU 110 may be connected to co-processor 115 through interconnect 112. One common type of coprocessor is the floating-point coprocessor, also called a numeric or math coprocessor, which is designed to perform numeric calculations faster and better than the general-purpose CPU 110.

It is appreciated that although an illustrative computing environment is shown to comprise the single CPU 110 that such description is merely illustrative as computing environment 100 may comprise a number of CPUs 110. Additionally computing environment 100 may exploit the resources of remote CPUs (not shown) through communications network 160 or some other data communications means (not shown).

In operation, the CPU 110 fetches, decodes, and executes instructions, and transfers information to and from other resources via the computer's main data-transfer path, system bus 105. Such a system bus connects the components in the computing system 100 and defines the medium for data exchange. The system bus 105 typically includes data lines for sending data, address lines for sending addresses, and control lines for sending interrupts and for operating the system bus. An example of such a system bus is the PCI (Peripheral Component Interconnect) bus. Some of today's advanced buses provide a function called bus arbitration that regulates access to the bus by extension cards, controllers, and CPU 110. Devices that attach to these buses and arbitrate to take over the bus are called bus masters. Bus master support also allows multiprocessor configurations of the buses to be created by the addition of bus master adapters containing a processor and its support chips.

Memory devices coupled to the system bus 105 include random access memory (RAM) 125 and read only memory (ROM) 130. Such memories include circuitry that allows information to be stored and retrieved. The ROMs 130 generally contain stored data that cannot be modified. Data stored in the RAM 125 can be read or changed by CPU 110 or other hardware devices. Access to the RAM 125 and/or ROM 130 may be controlled by memory controller 120. The memory controller 120 may provide an address translation function that translates virtual addresses into physical addresses as instructions are executed. Memory controller 120 may also provide a memory protection function that isolates processes within the system and isolates system processes from user processes. Thus, a program running in user mode can normally access only memory mapped by its own process virtual address space; it cannot access memory within another process's virtual address space unless memory sharing between the processes has been set up.

In addition, the computing system 100 may contain peripherals controller 135 responsible for communicating instructions from the CPU 110 to peripherals, such as, printer 140, keyboard 145, mouse 150, and data storage drive 155.

Display 165, which is controlled by a display controller 163, is used to display visual output generated by the computing system 100. Such visual output may include text, graphics, animated graphics, and video. The display 165 may be implemented with a CRT-based video display, an LCD-based flat-panel display, gas plasma-based flat-panel display, a touch-panel, or other display forms. The display controller 163 includes electronic components required to generate a video signal that is sent to display 165.

Further, the computing system 100 may contain network adaptor 170 which may be used to connect the computing system 100 to an external communication network 160. The communications network 160 may provide computer users with connections for communicating and transferring software and information electronically. Additionally, communications network 160 may provide distributed processing, which involves several computers and the sharing of workloads or cooperative efforts in performing a task. It will be appreciated that the network connections shown are exemplary and other means of establishing a communications link between the computers may be used.

It is appreciated that the exemplary computer system 100 is merely illustrative of a computing environment in which the herein described systems and methods may operate and does not limit the implementation of the herein described systems and methods in computing environments having differing components and configurations as the inventive concepts described herein may be implemented in various computing environments having various components and configurations.

Illustrative Computer Network Environment

Figure 2:
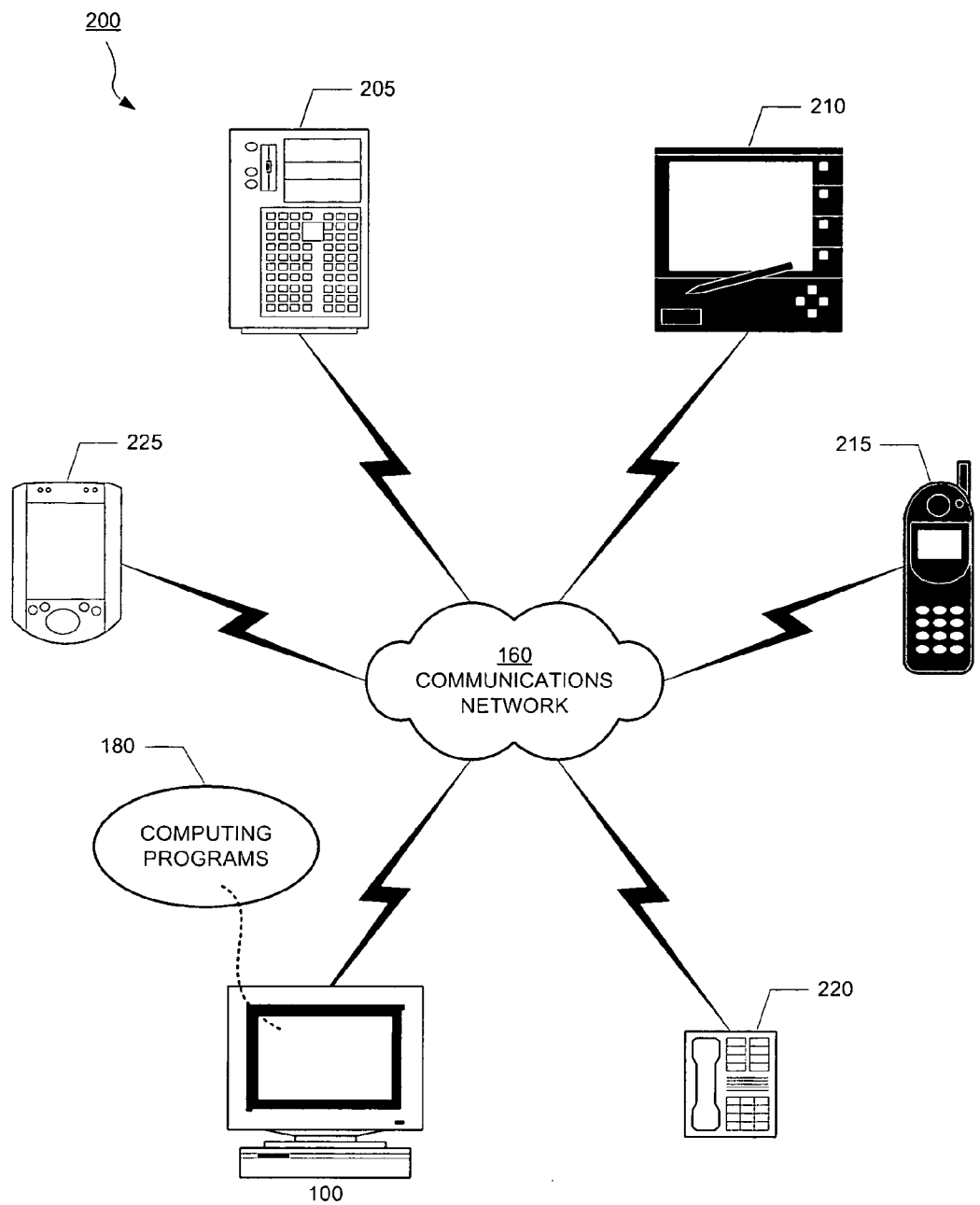
FIG. 2 is a block diagram showing the cooperation of exemplary components of an exemplary data communications architecture.

Computing system 100, described above, can be deployed as part of a computer network. In general, the above description for computing environments applies to both server computers and client computers deployed in a network environment. FIG. 2 illustrates an exemplary illustrative networked computing environment 200, with a server in communication with client computers via a communications network, in which the herein described apparatus and methods may be employed. As shown in FIG. 2, server 205 may be interconnected via a communications network 160 (which may be either of, or a combination of a wired or wireless LAN, WAN, intranet, extranet, peer-to-peer network, the Internet, or other communications network) with a number of exemplary client computing environments such as personal computer 100, tablet personal computer 210, mobile telephone 215, telephone 220, and personal digital assistant 225. Exemplary client computing environments may have any form factor, including but not limited to desktop, portable, mountable (such as on a rack or a wall), or wearable. Further examples of possible client computing environments include a wall screen, a wristwatch computer, or a wearable telephone such as an earring telephone.

In a network environment in which the communications network 160 is the Internet, for example, server 205 can be one or more dedicated computing environment servers operable to process and communicate data to and from exemplary client computing environments 100, 210, 215, 220, and 225 via any of a number of known protocols, such as hypertext transfer protocol (HTTP), file transfer protocol (FTP), simple object access protocol (SOAP), or wireless application protocol (WAP). Each exemplary client computing environment 100, 210, 215, 220, and 225 can be equipped with an operating system operable to support one or more computing applications 180 such as a web browser (not shown), or a mobile desktop environment (not shown) to gain access to server computing environment 205.

In operation, a user (not shown) may interact with a computing application running on a client computing environment to obtain desired data and/or computing applications. The data and/or computing applications may be stored on server computing environment 205 and communicated to cooperating users through exemplary client computing environments 100, 210, 215, 220, and 225, over exemplary communications network 160. A participating user may request access to specific data and applications housed in whole or in part on server computing environment 205. These data may be communicated between client computing environments 100, 210, 215, 220, and 220 and server computing environments for processing and storage. Server computing environment 205 may host computing applications, processes and applets for the generation, authentication, encryption, and communication of web services and may cooperate with other server computing environments (not shown), third party service providers (not shown), network attached storage (NAS) and storage area networks (SAN) to realize such web services transactions.

Exemplary Metadata and Namespace

Figure 3:
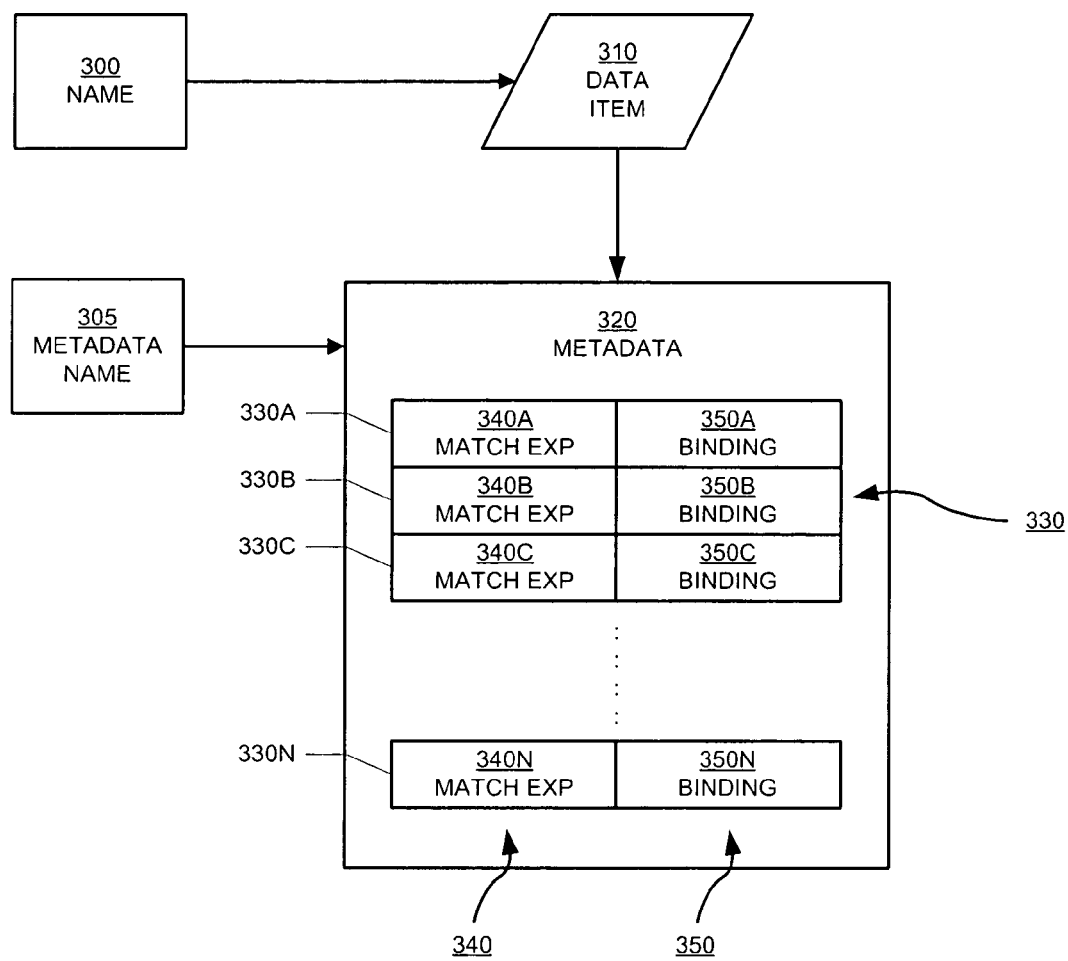
FIG. 3 illustrates a name, data item, and exemplary metadata for practicing an embodiment of the invention.

FIG. 3 illustrates a name 300, data item 310, and exemplary metadata item 320 for practicing an embodiment of the invention. A name 300 may be associated with a data item 310. The data item 310 is associated with metadata item 320 comprising information about the data item 310. A metadata item 320 is a special case of a data item 310. The metadata item 320 may be understood as simply a second data item which contains information about the first data item 310.

The data item 310 may be or may include any sort of data, metadata, document, file, text, graphics, instructions (e.g., XML code), templates (e.g., HTTP GET), actions (e.g., HTTP POST), media data, and the like.

The association of name 300 to data item 310 is generally one-to-one. Similarly, the association of metadata name 305 to metadata item 320 is generally one-to-one.

The association of name 300 to metadata item 320 may be one-to-one or many-to-one. That is, any of numerous names 300 may be associated with one instance of the metadata item 320, as more fully described below. Using aspects of the present invention, the metadata name 305 may be determined using the name 300. Every metadata name 305 is also a name 300, but not every name 300 is a metadata name 305.

The metadata item 320 comprises one or more rules 330A, 330B, 330C, ..., 330N (collectively, rules 330). For each name 300, the rules 330 allow the determination of a storage location where the corresponding data item 310 is stored. For example, data item 310 may be stored on server 205, on exemplary client computing environment 100, 210, 215, 220, 225, or at another storage location described by an applicable one of the rules 330.

The rules 330 comprise one or more match expressions 340A, 340B, 340C, ..., 340N (collectively, match expressions 340) and one or more bindings 350A, 350B, 350C, ..., 350N (collectively, bindings 350). An exemplary rule 330A comprises a match expression 340A and a binding 350A.

The match expression 340A describes a test for determining whether a particular name 300 is governed by the rule 330A. The result of the test may be expressed in Boolean logic; i.e., for a given name 300, the match expression 340A will be either true or false. If the match expression 340A is false, the rule 330A is not applicable to the name 300, and the binding 350A need not be examined.

If the match expression 340A is true, the binding 350A specifies the storage location where the data item 310 is stored. The binding 350A may express a storage location in any of numerous ways. For example, and not by way of limitation, the binding 350A may specify: a global IP address; a local identifier address or local IP address that allows a computer 100 to be discovered on a local network; a name 300 corresponding to a different data item 310 that contains any of the foregoing forms of address (thereby providing a level of indirection that allows addresses to be dynamically changed); or an identifier (such as a peer group identifier) that specifies that the data item 310 is stored collectively on a particular group of computers 100.

Metadata item 320 may be used for any of a variety of purposes, and may include additional information. In some implementations, metadata item 320 may include behavioral metadata (e.g., MIME type information) as well as mapping metadata (e.g., storage locations). In some implementations, metadata item 320 may indicate if data item 310 is persistent or temporary. In some implementations, metadata item 320 may specify an expiration time for data item 310. In some implementations, metadata item 320 may identify what machine and port to contact for reading or writing the data item 310. In some implementations, metadata item 320 may define or indicate how to interact with an external web-based service that can provide the data item 310. In some implementations, metadata item 320 may permit updates to the data item 310 (e.g., through HTTP GET and POST, or through SOAP or other interface methods). In some implementations, metadata item 320 may indicate whether any actions are to be executed upon modifying the data item 310. In some implementations, metadata item 320 may indicate whether any caches should be notified about changes to the data item 310, e.g., by propagating messages telling other machines that their copy of the data item 310 is now stale. In some implementations, metadata item 320 may provide a method that can generate the data item 310 if it is missing. In some implementations, if the data item 310 is temporary, metadata item 320 may identify a different data item that contains instructions for generating the data item 310.

Figure 4A:
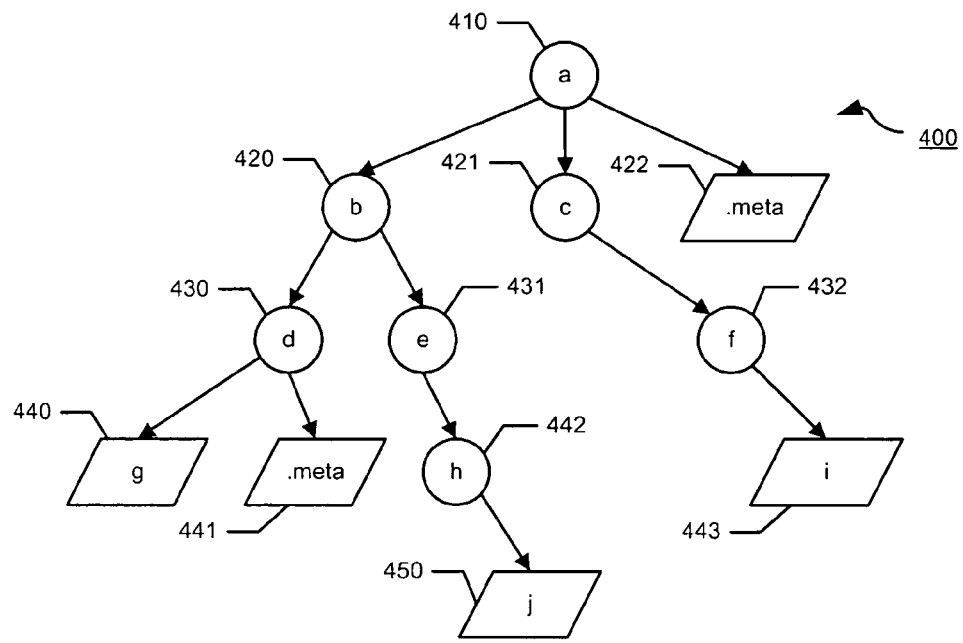
FIG. 4A depicts an exemplary namespace for practicing an embodiment of the invention.

FIG. 4A depicts an exemplary namespace 400 for practicing an embodiment of the invention. A namespace defines a set of valid names 300 for data items 310 (such as documents, metadata item 320, or other objects). A hierarchical structure for the namespace 400 helps eliminate ambiguity. The exemplary namespace 400 shown in FIG. 4 illustrates one of numerous ways in which a name 300 may be represented.

More generally, each data item 310 has a name 300 (identified as d in the following discussion) that may be represented as a list of strings. For example, d may be:

("foo", "bar", "baz", "blah")

which illustrates an exemplary name 300 having four components, each component being a string of characters. The number of components will be called the length of the name 300. A component may represent a data item 310, or may identify a folder, directory, container, or the like, for a plurality of data items 310. In some embodiments, only one component (generally the last, lowest, or rightmost component) may represent a data item 310.

In an exemplary software implementation, a function get (d) may be defined to take a name 300 as its argument, and to return the corresponding data item 310 for the name 300. Such a function may be implemented in any computer language, and in any of numerous ways; for example, get(d) may return a pointer to a memory location containing the data item 310 or a copy of the data item 310.

Similarly, for any d, a function length(d) may be defined to return the number of components. A particular component may be identified as d[i]. In some embodiments, such as those implemented in computing languages using zero-based offsets for arrays, d[0] identifies the first component, and d[length(d)−1] identifies the last component; accordingly, d[i] is defined for all values of i where $0 \leq i < \text{length}(d)$. A function last(d) may be defined to return d[length(d)−1], i.e., the last component. In the example of d set forth above, the function last(d) would return the string "blah".

Given a name 300 identified as d, which identifies a given data item 310, a corresponding metadata name 305 identified as m may be derived that identifies the metadata item 320 for the data item 310. The metadata name 305 m is the longest name (where longest means the highest value of length(m)) for which the following four conditions are all true:

1. m is not equal to d.

2. The value of last(m) is equal to a predefined metadata identifier (such as the string ".meta").

3. m[i] is equal to d[i] for all values of i where $0 \leq i < \text{length}(m)-1$. In other words, each component of m, other than the last component of m, is identical to the corresponding component of d.

4. The data item 310 returned by get(m) comprises metadata item 320 in which at least one of the rules 330 comprises a match expression 340 that is true for d.

To avoid the need to create a metadata item 320 for each regular data item 310, the foregoing three conditions provide a way to provide a metadata item 320 for entire subtrees of data items 310.

In the further example shown in FIG. 4A, the hierarchical nature of the namespace 400 is illustrated. Two illustrative instances of a metadata item 320 are shown, referred to herein as metadata item 422 and metadata item 441.

A top-level name component "a" 410 is identified by the string "a". Under "a" are name components "b" 420 and "c" 421, and a metadata item 422, named ".meta". The metadata item 422 is a data item 310 comprising metadata. Under "b" 420 are name components "d" 430 and "e" 431. Under "d" 430 are "g" 440, which is a data item 310, and metadata item 441, named ".meta", which is a data item 310 comprising metadata. Under "e" 431 is name component "h" 442, and under "h" 442 is a data item "j" 450. Under "c" 421 is name component "f" 432, and under "f" 432 is a data item "i" 443.

One possible name 300 in the exemplary namespace 400 is:

("a", "b", "d", "g")

To make the hierarchy more apparent, one may write this exemplary name 300 as "/a/b/d/g", which is notation consistent with a hierarchical file system such as that of Unix, Linux, various operating systems available from Microsoft Corporation, and the like.

In this simple example, the metadata item 320 for a name 330 "/a/b/d/g" is found by looking in turn in each of "/a/b/d/.meta", "/a/b/.meta", "/a/.meta", and "/.meta", each of which represents a possible metadata name 305 corresponding to the name 300. Finally, if all else fails, a default set of metadata may be used, which may be built into the software implementation or otherwise predetermined or determined by a different system. It should be noted that the string ".meta" is merely an example of a predefined metadata identifier, which may be any string or other type of identifier for specifying that a data item 310 comprises metadata item 320.

In the exemplary namespace 400 of FIG. 4A, there exists a metadata item 441 which has "/a/b/d/.meta" for its metadata name 205. Metadata item 441 serves as the metadata item 320 for every data item 310 having a name 300 that starts with "/a/b/d", such as data item "g" 440.

Table 1 shows an example of an implementation of metadata, expressed in XML-like pseudocode:

TABLE 1

```
<MetaData>
    <Child>
        <ExtensionMatch extension=".gif"/>
        <Access content-type="image/gif" expires-offset="3600"/>
    </Child>
    <Child>
        <ExtensionMatch extension=".txt"/>
        <Access content-type="text/plain" expires-offset="3600"/>
    </Child>
    <Child>
        <ExtensionMatch extension=""/>
        <Access content-type="text/xml" expires-offset="0"/>
    </Child>
</MetaData>
```

Table 2 shows an further example of an implementation of metadata, expressed in XML-like pseudocode:

TABLE 2

```
<MetaData>
    <Child>
        <PathMatch path="handhelds"/>
        <HttpAccess expires-offset="0">
            <ReadPattern
url="http://www.sample.edu:22000/this.proxyControl"/>
                <QueryArg name="singleHandheld" value="xml"/>
                <QueryArg name="name" value="$*" />
            </ReadPattern>
            <WritePattern url="http://www.sample.edu:22000/write"/>
                <QueryArg name="singleHandheld" value="xml"/>
                <QueryArg name="name" value="$*" />
            </WritePattern>
        </HttpAccess>
    </Child>
    <Child>
        <PathMatch path="a_nav_6699cc.gif"/>
        <Access host="www.examplegifsite.com" content-type=
"image/gif" expires-offset="3600" file="a_nav_6699cc.gif"/>
    </Child>
</MetaData>
```

Mapping of Storage Locations

Figure 4B:
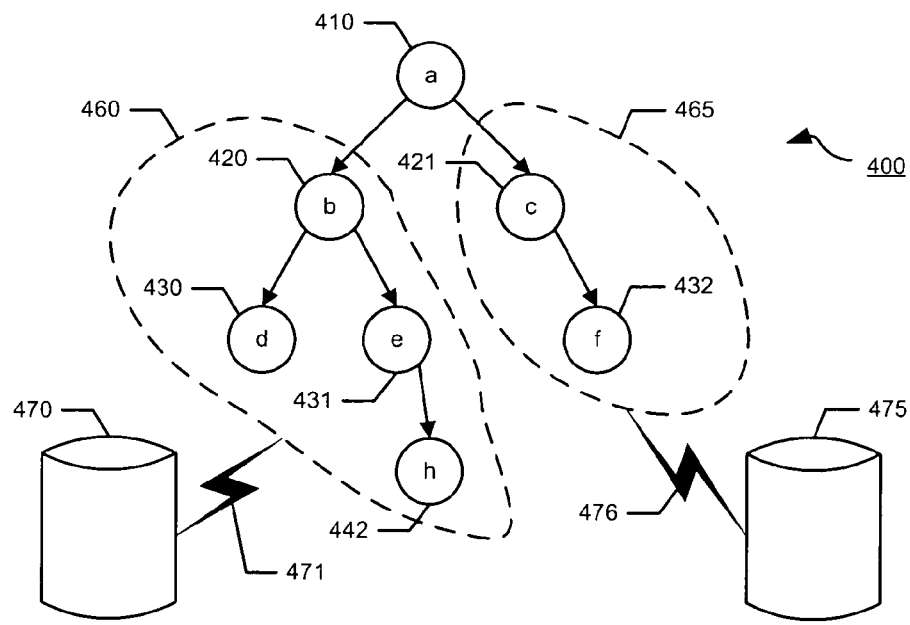
FIG. 4B depicts an exemplary mapping between a namespace and storage locations in an embodiment of the invention.

FIG. 4B depicts an exemplary mapping between a namespace 400 and storage locations 470, 475 in an embodiment of the invention. This illustrates, for example, how a metadata item 320 might be used to map different parts of a data model onto different storage providers 470, 475. A storage provider 470, 475 may be a server 205, a client 100, 210, 215, 220, 225, or a particular storage system or file system associated with a server 205 or client 100, 210, 215, 220, 225.

In some cases the metadata item 320 for a data item 310 will be stored persistently on a different computer than the data item 310 itself. A top-level metadata item 320, for instance, may be stored on a computer (such as server 205) that is readily accessible to other computers (such as clients 100, 210, 215, 220, 225); this top-level metadata item 320 may indicate that other subtrees of data items 310 are stored on other computers. Metadata item 320 can, however, exist at any place in the hierarchical namespace 400. This provides users and application authors greater control over their own data items 310.

Metadata item 320 contains multiple rules 330. Each rule 330 defines at least a property (such as one of the bindings 350) for a set of children (e.g., a subtree in a hierarchical namespace 400) matching a corresponding one of the match expressions 340.

Subtree "b" 460 contains name component "b" 420 and all name components beneath "b" 420. A sibling subtree "c" 465 contains name component "c" 421 and all name components beneath "c" 421. Link 471 represents a binding 350 between subtree "b" 460 and a storage provider 470 for storing data items 310 of subtree "b" 460. Link 476 represents a binding 350 between subtree "c" 465 and a storage provider 475 for storing data items 310 of subtree "c" 465.

For illustrative purposes, Table 3 shows exemplary rules 330, illustrated in XML-like pseudocode, for the namespace 400 depicted in FIG. 4B. In the example of Table 3, two exemplary match expressions 340 are name="b" and name="c", and two exemplary bindings 350 are host="a.example.com:8080" and host="www.other.com: 1234"; these represent a mapping in which subtree "b" 460 is mapped to host "a.example.com:8080" and sibling subtree "c" 465 is mapped to a host "www.other.com:1234".

TABLE 3

```
<MetaData>
    <Child name="b">
        <Access host="a.example.com:8080"/>
    </Child>
    <Child name="c">
        <Access host="www.other.com:1234"/>
    </Child>
</Metadata>
```

Match expressions 340 may include regular expressions, such as patterns containing wild cards (e.g., asterisks and the like), for matching a plurality of names 300. In addition to testing for equality or identity, match expressions 340 may in some implementations permit the use of a variety of boolean and other operators (such as "and", "or", "not equal", "less than", "greater than" and the like) as well as other variables, functions, and the like, to form a match expression 340 that may be evaluated as true or false.

Further examples of match expression 340 include matching of file extensions, such as "<ExtensionMatch extension=".gif"/>", for matching files in Graphic Interchange Format (GIF). Still further examples of match expression 340 include path matching to select a subset of children documents (such as "<PathMatch path="device/*/*"/>") for matching all files matching a specified path relative to the location of the metadata item 320. For example, if the metadata item 320 had "/a/b/.meta" for its metadata name 305, then the match expression 340 "<PathMatch path="device/*/ *"/>" will match any name 300 of the form "/a/b/device/*/*".

Some implementations may be limited to a single storage location for a data item 310 or subtree 460, 465; however, other implementations may include multiple storage locations, and may provide support for changing storage locations.

Exemplary Method

Figure 5:
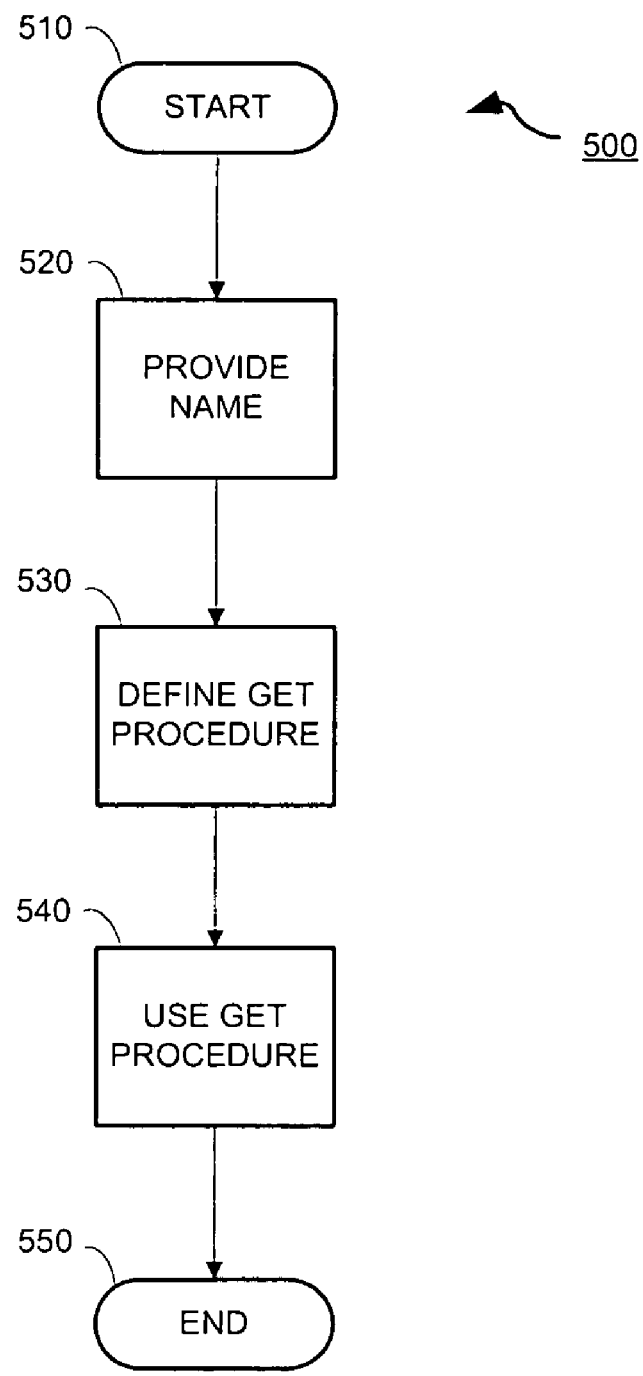
FIG. 5 is a flow chart of a method for using metadata according to an embodiment of the present invention.

FIG. 5 shows a method 500 for data naming according to an embodiment of the present invention. The method 600 begins at start block 510, and proceeds to block 520.

At block 520, a name 300 is provided, corresponding to a desired data item 310.

At block 530, a get procedure is defined that includes receiving the name 300, and in some embodiments, determining a metadata name 305 from the name 300. The get procedure is used recursively upon the metadata name 305, to retrieve a metadata item 320 associated with the desired data item 310. The desired data item 310 may then be retrieved. Retrieval may, for example, include retrieving the desired data item 310 from a local or networked mass storage system, a memory system, a cache, or the like.

In some embodiments, a computer 100 is able to cache recently retrieved data items which may include the desired data item 310. For example, when calling the get procedure for an exemplary name 300 "/a/b/c/d", the get procedure may be able to examine a local cache to check whether the desired data item 310 is already there. If so, the get procedure may return the desired data item 310 without further recursion.

In further embodiments, default metadata item 320 is provided, and the get procedure is able to return the default metadata item 320. For example, if the get procedure is unable to determine a metadata name 305 from the name 300, or if the get procedure is unable to retrieve metadata item 320, the get procedure may return the default metadata item 320.

The get procedure may be implemented in any computer language, and in any of numerous ways, as will be apparent to one skilled in the art; for example, the get procedure may return a pointer to a memory location containing the desired data item 310 or a copy of the desired data item 310.

At block 540, the get procedure defined in block 530 is used for the name 300. The method 500 then concludes at block 540.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method, comprising:
receiving a data name of a desired data item, wherein the data name comprises a hierarchical arrangement of name components defining a level of the desired data item in a hierarchical name space;
retrieving a metadata item that is associated with the desired data item based on the data name, wherein the retrieving comprises recursively searching from the level of the desired data item in the name space and upward through the namespace for a metadata name of the metadata item, and the metadata item comprises one or more bindings that specify respective storage locations of data items, wherein the retrieving comprises determining the metadata name of the metadata item from the data name; and
determining a storage location of the desired data item from the metadata item, wherein the determining comprises matching the data name to a respective one of the bindings in the metadata item that specifies the storage location of the desired data item;
wherein the receiving, the searching, and the determining are performed by computer hardware.

2. The method of claim 1, wherein the retrieving comprises retrieving a default metadata item in response to a failure to determine the metadata name from the data name.

3. The method of claim 1, further comprising providing a default metadata item.

4. The method of claim 3, wherein the retrieving comprises retrieving the default metadata item in response to a failure to retrieve the metadata item that is associated with the desired data item.

5. The method of claim 1, wherein the retrieving comprises determining the metadata name of the metadata item, and the determining of the metadata name comprises determining a longest metadata name for which:
the metadata name is not equal to the data name,
a final name component of the metadata name matches a metadata identifier,
each non-final name component of the metadata name matches a corresponding non-final name component of the data name, and
the metadata item associated with the metadata name comprises at least one rule having a match expression that is true for the data name.

6. The method of claim 5, wherein a non-final name component of the metadata name identifies a subtree.

7. The method of claim 6, wherein the subtree is bound to a storage location.

8. The method of claim 1, wherein the metadata item comprises at least one rule that matches the desired data item to a binding that specifies a storage location of the desired data item.

9. The method of claim 8, further comprising retrieving the desired data item from the determined storage location.

10. The method of claim 1, wherein the metadata item comprises at least one rule having a match expression that is true for the data name.

11. A system, comprising:
a computer configured to retrieve a first data item having a data name,
the first data name comprising a hierarchical arrangement of name components defining a level of the first data item in a namespace, and at least one of the name components is associated with a subtree of the namespace,
the computer being arranged in use to communicate with a storage provider for the subtree, the storage provider being configured to store at least the first data item, and
the first data item being associated with a metadata that binds the first data item to the storage provider, wherein in retrieving the first data item the computer determines from the data name a metadata name of a second data item by recursively searching from the level of the first data item in the name space and upward through the namespace for the metadata name of the second data item.

12. The system of claim 11, wherein the computer is configured to retrieve the first data item using a default metadata item.

13. The system of claim 11, wherein the second data item comprises a default metadata item.

14. The system of claim 11, wherein the computer is configured to retrieve the second data item using a default metadata item.

15. The system of claim 11, wherein the computer determines the metadata name by searching for a longest metadata name for which:
the meta data name is not equal to the data name,
a final name component of the metadata name matches a metadata identifier,
each non-final name component of the metadata name matches a corresponding non-final name component of the data name, and
the second data item associated with the metadata name comprises at least one rule having a match expression that is true for the data name.

16. A system, comprising:
a storage provider for a subtree of a namespace, the storage provider being configured to store at least a first data item having a data name, and being configured to communicate with a computer configured to retrieve the first data item,
the data name comprising a hierarchical arrangement of name components defining a level of the data item in the namespace, and at least one of the name components is associated with the subtree, and
the first data item being associated with a metadata that binds the first data item to the storage provider, wherein in retrieving the first data item the computer determines from the data name a metadata name of a second data item by recursively searching from the level of the data item in the name space and upward through the namespace for the metadata name of the second data item.

17. The system of claim 16, wherein the computer is configured to retrieve the first data item using a default metadata.

18. The system of claim 16, wherein the second data item comprises a default metadata.

19. The system of claim 16, wherein the computer is configured to retrieve the second data item using a default metadata.

20. The system of claim 16, the computer determines the metadata name by searching for a longest metadata name for which:
- the metadata name is not equal to the data name,
- a final name component of the metadata name matches a metadata identifier,
- each non-final name component of the metadata name matches a corresponding non-final name component of the data name, and
- the second data item associated with the metadata name comprises at least one rule having a match expression that is true for the data name.

21. A computer-readable storage medium storing computer-readable instructions which, when executed by a computer, cause the computer to perform operations comprising:
- receiving a data name of a desired data item, wherein the desired data name comprises a hierarchical arrangement of name components defining a level of the desired data item in a hierarchical name space;
- retrieving a metadata item that is associated with the desired data item based on the data name, wherein the retrieving comprises recursively searching from the level of the desired data item in the name space and upward through the namespace for a metadata name of the metadata item, and the metadata item comprises one or more bindings that specify respective storage locations of data items, wherein the retrieving comprises determining the metadata name of the metadata item from the data name; and
- determining a storage location of the desired data item from the metadata item, wherein the determining comprises matching the data name to a respective one of the bindings in the metadata item that specifies the storage location of the desired data item.

22. The computer-readable storage medium of claim 21, wherein the retrieving comprises determining the metadata name of the metadata item from the data name.

23. The computer-readable storage medium of claim 21, wherein, when executed by the computer, the instructions further cause the computer to perform operations comprising providing a default metadata.

24. The computer-readable storage medium of claim 23, wherein the retrieving comprises retrieving the default metadata in response to a failure to determine the metadata name from the data name.

25. The computer-readable storage medium of claim 21, wherein the retrieving comprises retrieving the default metadata item in response to a failure to retrieve the metadata item that is associated with the desired metadata item.

26. The computer-readable storage medium of claim 21, wherein the retrieving comprises determining a metadata name of the metadata item, and the determining of the metadata name comprises determining a longest metadata name for which:
- the metadata name is not equal to the data name,
- a final name component of the metadata name matches a metadata identifier,
- each non-final name component of the metadata name matches a corresponding non-final name component of the data name, and
- the metadata item associated with the metadata name comprises at least one rule having a match expression that is true for the data name.

27. The computer-readable storage medium of claim 21, wherein a non-final name component of the metadata name identifies a subtree.

28. The computer-readable medium of claim 21, wherein the subtree is bound to a storage location.

29. The computer-readable storage medium of claim 21, wherein the metadata item comprises at least one rule that matches the desired data item to a binding that specifies a storage location of the desired data item.

30. The computer-readable storage medium of claim 21, wherein, when executed by the computer, the instructions further cause the computer to perform operations comprising retrieving the desired data item from the determined storage location.

31. The computer-readable storage medium of claim 21, wherein the metadata item comprises at least one rule having a match expression that is true for the data name.

32. A system, comprising:
- computing means for performing operations comprising:
  - receiving a data name of a desired data item, wherein the desired data name comprises a hierarchical arrangement of name components defining a level of the desired data item in a hierarchical name space;
  - retrieving a metadata item that is associated with the desired data item based on the data name, wherein the retrieving comprises recursively searching from the level of the desired data item in the name space and upward through the namespace for a metadata name of the metadata item, and the metadata item comprises one or more bindings that specify respective storage locations of data items, wherein the retrieving comprises determining the metadata name of the metadata item from the data name; and
  - determining a storage location of the desired data item from the metadata item, wherein the determining comprises matching the data name to a respective one of the bindings in the metadata item that specifies the storage location of the desired data item.

* * * * *

UNITED STATES PATENT AND TRADEMARK OFFICE
CERTIFICATE OF CORRECTION

| | | |
|---|---|---|
| PATENT NO. | : 7,797,359 B1 | Page 1 of 1 |
| APPLICATION NO. | : 11/209528 | |
| DATED | : September 14, 2010 | |
| INVENTOR(S) | : Eamonn O'Brien-Strain et al. | |

It is certified that error appears in the above-identified patent and that said Letters Patent is hereby corrected as shown below:

In column 12, line 39, in Claim 15, delete "meta data" and insert -- metadata --, therefor.

Signed and Sealed this
Fourth Day of October, 2011

David J. Kappos
*Director of the United States Patent and Trademark Office*